Feb. 14, 1956 W. R. SPILLER ET AL 2,734,577
MULTIPLE SPINDLE PAPER DRILL
Original Filed Dec. 26, 1946 4 Sheets-Sheet 4
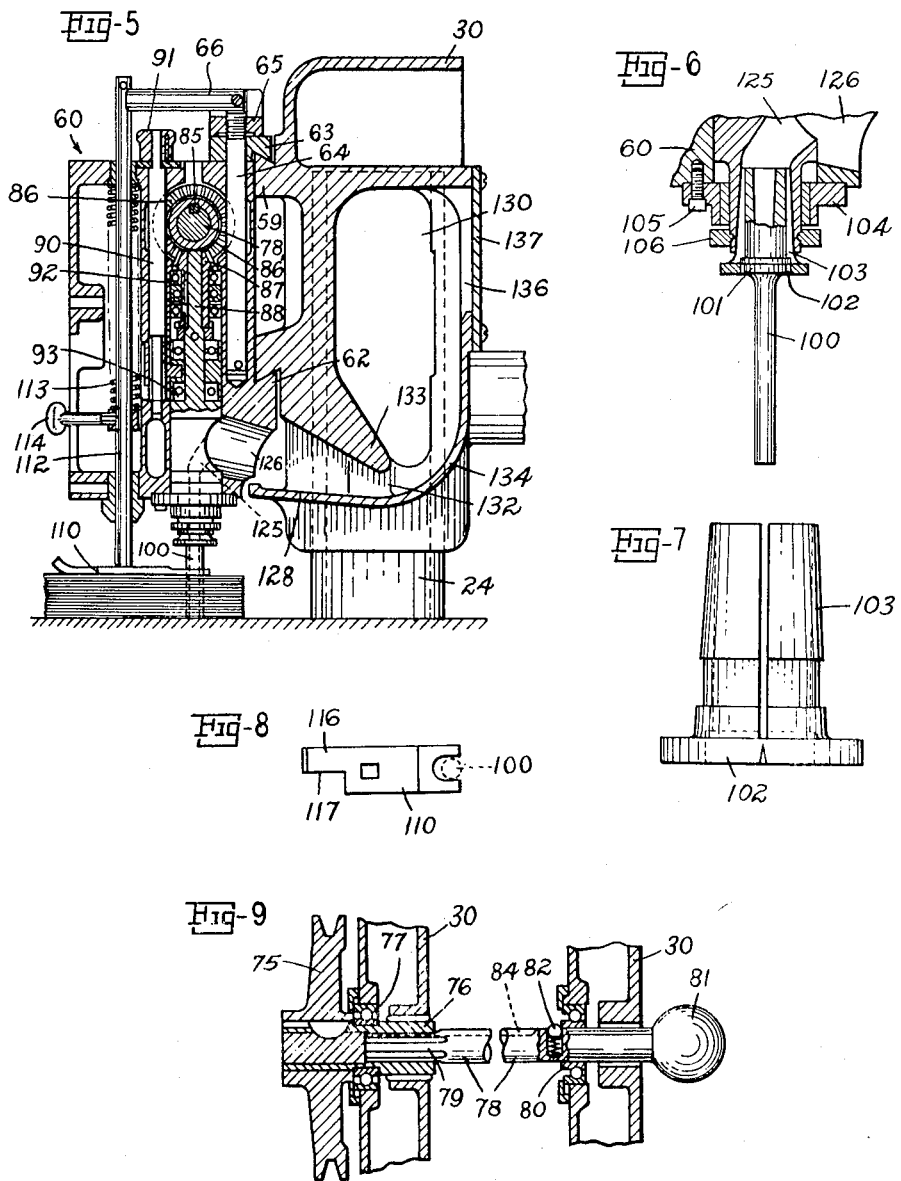

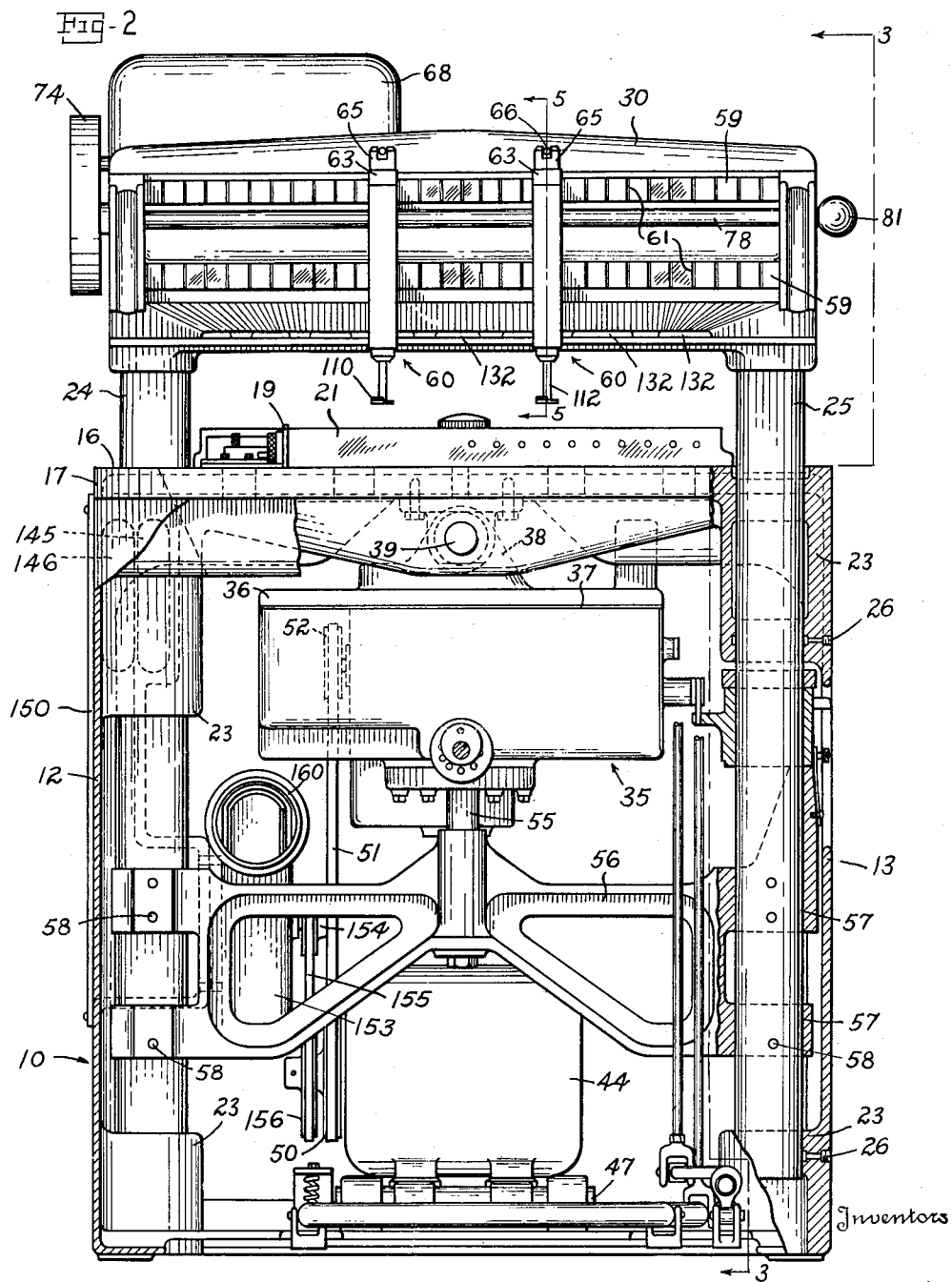

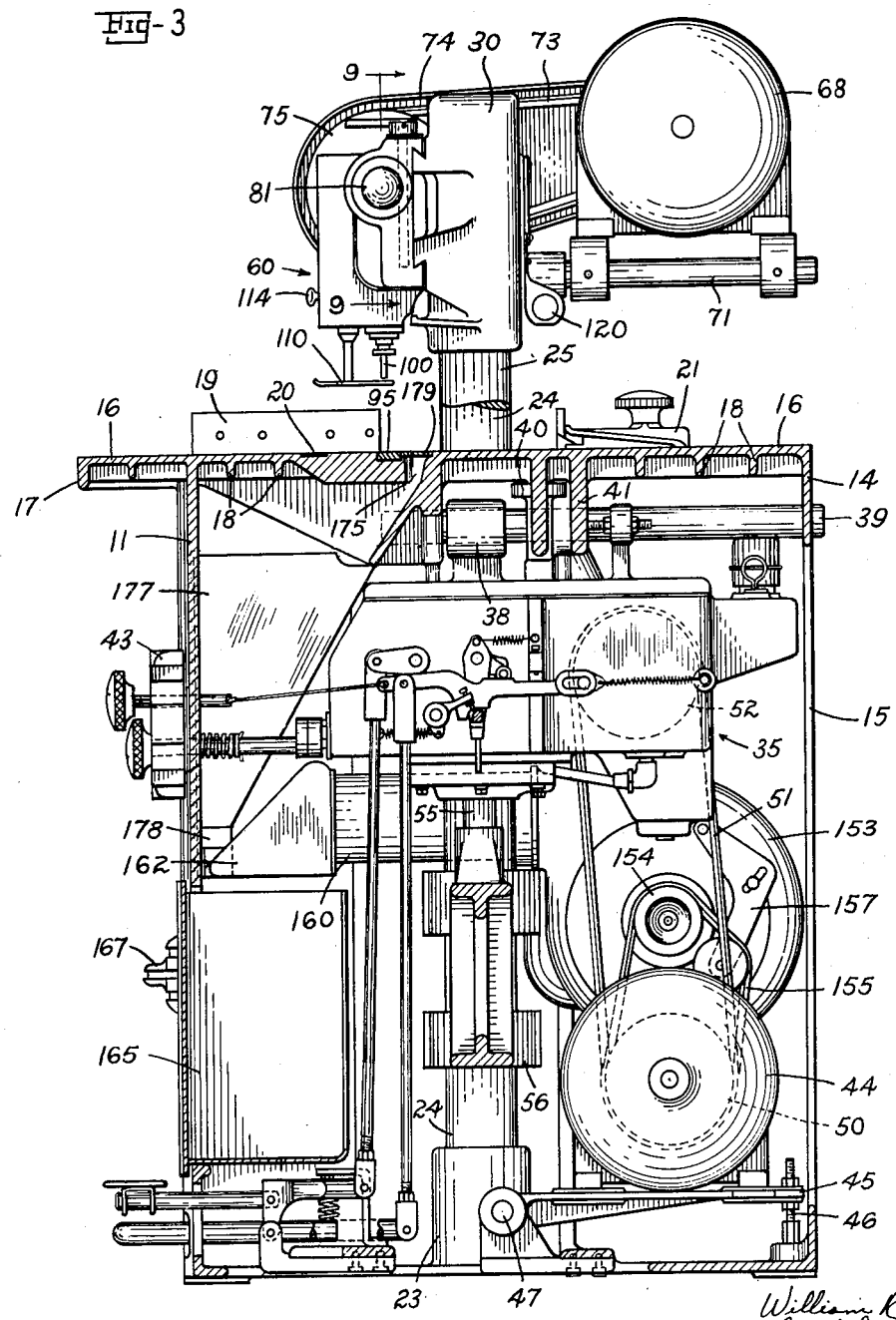

United States Patent Office 2,734,577
Patented Feb. 14, 1956

2,734,577
MULTIPLE SPINDLE PAPER DRILL

William R. Spiller, Cleveland, and Lloyd L. West, Dayton, Ohio, assignors to Harris-Seybold Company, Cleveland, Ohio, a corporation of Delaware Original application December 26, 1946, Serial No. 718,380, now Patent No. 2,637,396, dated May 5, 1953. Divided and this application June 30, 1952, Serial No. 296,282

6 Claims. (Cl. 164—90)

This invention relates to power drills and more particularly to multiple spindle drills for drilling paper and the like. This application is a division of our copending application Serial No. 718,380, filed December 26, 1946, and now Patent No. 2,637,396.

It is the principal object of the invention to provide a multiple spindle drill which is simple and economical in construction, safe and reliable in operation, which is rapid in its action, and the operation of which is at all times under the ready control of the operator.

It is a further object to provide a multiple spindle drill in which any individual drill head can be separately removed, replaced or adjusted without affecting any of the other drill heads.

It is a further object to provide a paper drill in which the individual drills are received in a chuck which provides for securely holding the drill and taking the thrust thereof in use while allowing for ready removal and replacement thereof.

Other objects and advantages will be apparent from the following description, the accompanying drawings and the appended claims.

In the drawings—

Fig. 2 is a view of the machine partially in front elevation, with the front housing and the right hand post guides being broken away, certain parts such as the chip collecting mechanism and the drawer being removed to better show the construction;

Fig. 3 is a vertical sectional view from one side substantially on the line 3—3 of Fig. 2;

Fig. 5 is a vertical sectional view through one of the drill heads in operative position substantially on the line 5—5 of Fig. 2;

Fig. 6 is an enlarged detail view showing the means for detachably receiving the paper drill in the drill head;

Fig. 7 is a further enlarged view showing the tapered chuck in elevation;

Fig. 8 is a detail view of the presser foot and centering index;

Fig. 9 is a vertical broken sectional view showing the drive for the individual drill heads which enables them to be separately adjusted and removed, the section being taken on the line 9—9 of Fig. 3.

Figure 1:
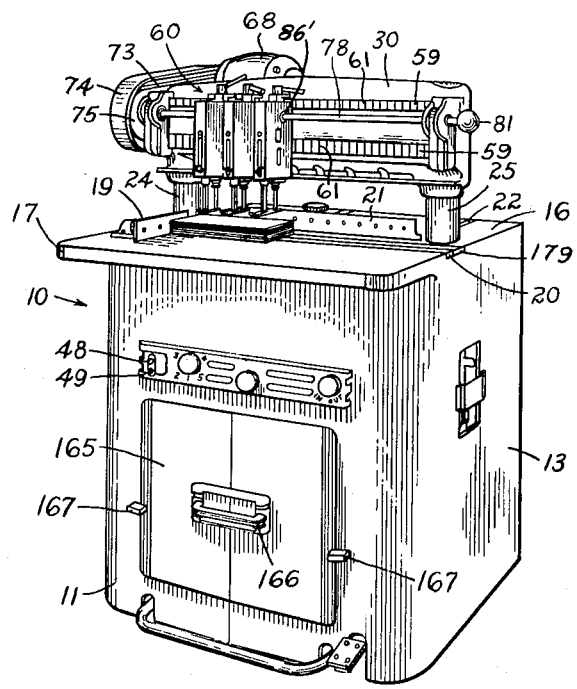
Fig. 1 is a view in perspective of a machine constructed in accordance with the present invention.

Referring to the drawings which illustrate a preferred embodiment of the machine, and more particularly to Figs. 1 through 4, the machine is shown as comprising a main frame 10 in the form of a hollow shell, which is preferably formed as an integral casting incorporating a front wall 11, a left hand side wall 12, a right hand side wall 13, and a rear wall 14, the latter being open over the greater part of its extent as shown at 15 (Fig. 3). The top 16 is shown as formed integrally, and is arranged with a forward portion 17 overhanging the front wall 11, the top being suitably ribbed as shown at 18 to afford additional stiffness.

Figure 4:
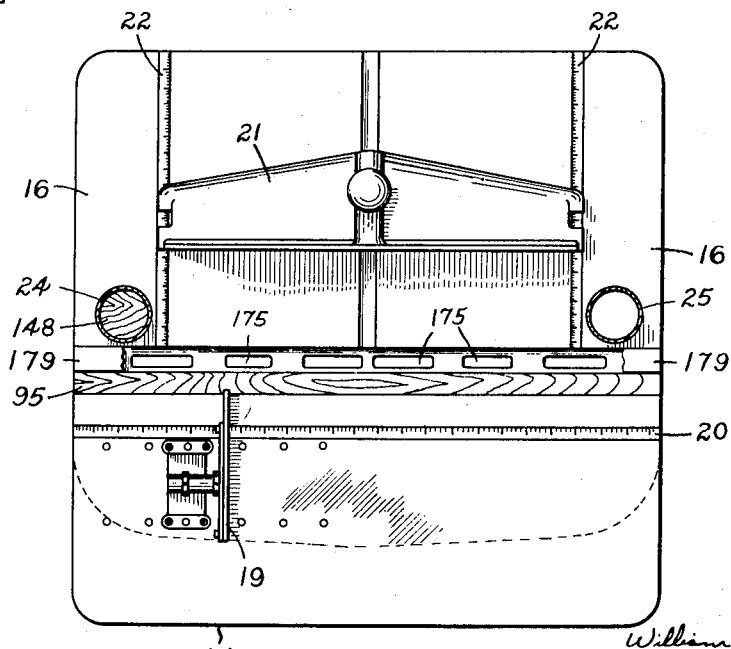
Fig. 4 is a horizontal sectional view showing the top of the work table in plan.

The top forms an essentially flat rectangular work table surface as shown in Fig. 4. The work table is formed with a series of apertures for adjustably receiving the gage 19 the position of which can be set with reference to a scale 20. A back gage 21 is adjustable at right angles to the front gage and its position may be determined by scales 22, such gage mechanism being known in the art.

Inwardly of the side walls pairs of lower and upper bosses 23 are provided, which are preferably formed integrally with the main frame 10. Both sets of bosses are bored to provide for receiving the guide posts 24, 25, and suitable lubricant injecting means 26 are preferably provided which are accessible from outside the frame to lubricate the posts in their reciprocating travel in the guides.

The posts 24, 25 support the rail assembly 30 on their upper ends, the rail extending transversely across the width of the work table and providing a support for the individual drill heads. The machine as illustrated thus embodies a work table with a rail movable relative thereto and supporting the individual drill heads, the structure illustrated providing a stationary table cooperating with the reciprocating drill heads; it will be evident however that the table may be caused to reciprocate with respect to relatively fixed drill heads while still maintaining the same essential features of operation and control.

Hydraulic power operating mechanism is provided for causing such relative reciprocating motion, this mechanism being in the form of a power pack indicated generally at 35, as comprising a closed integral casing for receiving the power operating mechanism and likewise forming a reservoir for the hydraulic fluid. The casing 35 has a removable cover 36 which is normally secured in fluid-tight relation thereto by means of gasket 37. In order to support the power pack in proper position within the hollow base of the machine the cover 36 is formed with an upstanding lug 38, and a bar 39 extends through lug 38, likewise extending through a bearing 40 mounted in the elongated flanges 41 of a plurality of the ribs which are integral with the under side of the work table 16. The bar is thus normally supported from beneath the work table, but when it is desired to install or remove the power pack, the bearing 40 is removed and the power pack can then be moved rearward on the bar and thus removed as a unit.

A drive motor 44 is pivotally mounted upon a platform 45 in the lower rear portion of the base, suitable adjusting means 46 being provided to rock the platform about its pivot 47 for the purpose of maintaining the proper tension in the drive pulley. The motor is conveniently controlled by start and stop buttons 48, 49 mounted on a panel 43 on the front face 11 of the frame. The shaft of the motor carries drive pulley 50 over which there operates V-belt 51 which has driving engagement with the pulley 52 which supplies the power to the power pack.

The fluid actuated piston within the power pack has a shaft 55 which extends downwardly from the lower side of the power pack as shown in Figs. 2 and 3 where it has connection with a cross head 56 having laterally extending arms which are bored as shown at 57 to receive the posts 24 and 25, respectively. The opposite arms of the cross head are secured to the posts by means of a series of pins 58 so that vertical movement of the cross head is transmitted directly to the two posts, and thereby to the rail assembly 30 of the machine. The operation of the hydraulic mechanism and its controls are described in detail in our above patent and also in our copending application Serial No. 296,281 filed of even date herewith.

Rail assembly and drill heads

Referring now to Figs. 5 through 9, the rail assembly 30 is formed as an integral casting with parallel gibs 59 extending transversely across its face and serving as a support to adjustably receive the individual drill heads indicated generally at 60. As shown in Fig. 2 the vertical face of the rail is preferably marked with a series of parallel indications 61 to facilitate the proper assembly and alignment of the drill heads thereon.

Each drill head 60 (Fig. 5) is formed with cooperating dovetail clamps 62, 63, the latter being adjustable upon stem 64, by means of nut 65 rotatably received on the threaded end of the stem and adjustable by means of handle 66. With this construction the nut can be loosened to allow each individual drill head to be mounted on the gibs 59, and the nut tightened to secure the drill head in place thereon, each such assembly and disassembly operation taking place independently of the positioning of any other drill head.

In order to drive the drills, a drive motor 68 (Fig. 3) also controlled by start and stop buttons 48, 49 on the front panel of the main frame, is mounted upon bar 71 secured in the rear face of the assembly 30, the motor having a drive belt such as V-belt 73 protected by a cover 74 and running over driven pulley 75 (Fig. 9) which is keyed to a female spline member 76 rotatably journaled upon anti-friction bearings 77 in the end of the rail assembly 30. A transverse shaft 78 having a male spline 79 is receivable within the spline member 76, and extends through the right hand wall of the rail assembly 30 where it is rotatably supported in anti-friction bearing 80, a suitable handle portion 81 being accessible on the outside of the rail assembly 30 for ready manipulation. The spring pressed detent 82 yieldably retains the shaft in its fully engaged and operative position while allowing axial withdrawal thereof from the right hand side of the rail.

The shaft 78 has a key-way 84 therein which is adapted to receive the keys 85 secured to the hollow hub portion 86' of each drive pinion 86 (Fig. 5) by which these pinions are supported in the individual drill heads. Gear 86 is a bevel gear as shown and engages with beveled pinion 87 for operation of the individual drill. With this construction as shown, the shaft 78 may be wholly withdrawn from the rail assembly without affecting any part of the drill heads 60. This in turn makes it possible to remove an individual drill head by simply loosening the nut 65 thereon sufficiently to permit the associated clamp 63 to be released from the upper gib 59, or one or more additional drill heads may similarly be mounted on the gibs 59 from the front of the machine, and in either case such removal or addition of drill heads can be accomplished without affecting the adjustment of other drill heads already in place. Thereafter it is merely necessary to replace the shaft 78, and the machine will be ready for operation.

The drill shaft for driving one of the drill heads 60 is shown at 88 and is slidably but non-rotatably received within the shank of pinion 87 to provide for vertical adjustment in the position of the drill under the control of adjusting shaft 90 and control member 91. As shown in Fig. 5 the drill has been adjusted to its lowermost position relative to the drill head and may be raised above that position by suitable actuation of control knob 91 such adjustment providing, for example, a variation in vertical positioning of the drill of about ⅜ inch. Bearing set 92 for the pinion 87 and thrust bearing 93 for taking the thrust on shaft 88 are provided for effecting the vertical adjustment of the drill socket to bring the drill into accurate relation with the cutting stick 95 received with a slot in the top of the work table. Attention is directed to the patent to Wright 1,835,551 of 1931 assigned to the same assignee as the present application for a further description of the construction and operation of this portion of the mechanism.

The drill is indicated at 100 as comprising a hollow tubular member, and is preferably provided with a shoulder 101 (Figs. 5 to 7) adapted to engage in a recess 102 formed in the end of a split chuck 103, the outer circumference of which is tapered to be received within the lower end of the drill shaft 88. The lower end of the drill shaft operates in spaced relation with respect to a retainer ring 104 secured to the lower face of the drill head 60 by means of bolts 105. An abutment ring 106 is secured to the drill shaft in such position that a suitable forked tool may be engaged against the abutment and the outer flange on the chuck to pry the latter out of the socket when it is desired to remove the drill from its socket.

This construction provides a simple and highly satisfactory mounting for the individual drills, providing for the ready removal and replacement thereof in their respective chucks, the thrust developed when the drill engages the work being effective through the tapered clamping chuck for gripping the drill more tightly and assuring its proper driving relation. At the same time the shoulder 101 provides a positive means of transferring the thrust, and avoids the difficulty encountered in the prior art constructions which frequently had a tendency to wear, allowing the drill to wedge in its socket from which it could be removed only with considerable difficulty.

A presser-foot 110 (Figs. 5 and 8) is carried upon a rod 112 which is vertically mounted in the head 60 and spring urged into work engaging position by means of spring 113, a handle 114 being provided by means of which it can be manually raised to free the work. As shown in Fig. 8 the presser-foot 110 has a forwardly projecting finger 116 thereon, the side edge 117 of which is accurately aligned with the center of the drill 100. Thus in setting up the drill initially, the index finger 116 and more particularly the edge 117 thereof can be adjusted with reference to scale 20 formed in the top of the work table, in that way providing for establishing an accurate spacing of the drill heads in predetermined relation to each other, to the gages, etc. A light source 120 (Fig. 3) is suitably mounted on the rear of the rail assembly in position to afford illumination for the work table.

Collection and disposal of chips

Hollow paper drills of the present type produce a substantial quantity of chips, in the form of paper confetti, the chips being passed upwardly through the hollow interior of the drill. The present machine provides for removing these chips from the drills wherever they may be located along the rail assembly, and for discharging them into a common receiver or container from which they may be readily removed from the machine. Referring to Fig. 5, each drill shaft has a curved passage 125 therein communicating directly with the upper end of the hollow drill itself and extending in a curved path toward one side where it discharges into a contoured passage 126 in the head. This passage provides for dropping the chips downwardly upon a plate 128 which is formed integrally with the rail assembly 30, the plate having a forwardly extending portion which closely underlies the baffle to assure the dropping of the chips thereon.

It is important to provide for collection of the chips from the individual drill heads in whatever positions they may occupy across the face of the rail 30, and to accomplish this result without requiring individual connections to be made to these separate drill heads. For this purpose the collecting system shown in detail in our above patent is provided, comprising a relatively large vacuum chamber 130 which is conveniently formed by coring the rail 30. A series of restricted entrances 132 thereto are provided across the width of the rail, and are defined at the top thereof by a downwardly extending forward wall 133 integral with the rail 30 and an upwardly curved rear wall 134 within the chamber. Suitable openings 136 may be provided at spaced points along the rear wall of chamber 130, and are normally closed by access plates 137 secured thereto, which are removable when necessary to afford access to the passage.

At the left hand end of the rail, the passage 130 communicates with the upper end of the hollow post 24. The post is closed at its upper end, and at an intermediate point in its length, namely, that portion which is received within the left hand upper boss 23 of the base, it is formed with a vertical slot 145 which communicates with a corresponding passage 146 formed within boss 23 and leading into a downwardly extending passage closed by a cover plate 150 mounted on the side wall 12 of the machine, thus forming a closed chamber for the travel of the chips therethrough. At the lower end of this chamber, the chips travel into the open end of a blower 153 suitably mounted upon the wall of the frame and having a drive pulley 154 driven by V-belt 155 from a second drive pulley 156 (Fig. 2) on the shaft of motor 44. A suitable belt tightener and idler pulley assembly 157 may be provided as shown in Fig. 3.

The discharge of the blower leads through forwardly extending tube 160 to a screen box 162 located centrally and immediately behind the front wall 11 of the main frame. The lower end of the box 162 is open and is positioned immediately above a chip drawer 165 having a handle 166 which is suitably received in a recess in the front of the machine, being removably secured therein by latch means 167.

In the operation of the machine for producing marginal slits or slots in the paper, chips are also formed, appearing in this case on the top of the work table 16 and substantially immediately in the vicinity, or to the rear, of the drill heads on which the slitting or slotting attachment knives are secured. In order to provide for the collection of these chips, the work table is provided with a series of openings 175 which extend in a line across the width of the machine as shown in Fig. 4 and provide for the collection and delivery of the chips through a funnel 177 having a discharge opening 178, directly leading into the receptacle 165. Thus the chips from both sources are readily collected, and in the case of the slots 175, the chips fall directly by gravity into the receiving container. In some cases where no such slotting operations are to be performed, it is preferred to close the opening 175 by means of a plate 179 which overlies the series of openings and thus forms a smooth uniform work table surface.

It will thus be apparent that the invention provides a hydraulic paper drill which is simple, safe and reliable in operation, which can be readily constructed and repaired when necessary, and which is highly advantageous in the range of its adjustment and flexibility to meet different conditions in use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A multiple spindle paper drill comprising a work table, a plurality of drill heads, a rail assembly for receiving and supporting said plurality of drill heads in aligned working relation with respect to each other and said table, a drive shaft adapted to be engaged in driving relation with all of said aligned drill heads by axial movement thereof lengthwise of said rail assembly, releasable retaining means for said shaft defining the operative position thereof in said driving relation with said drill heads and providing for axial withdrawal of said shaft from said aligned drill heads, drive means on said rail assembly, said shaft and said drive means including portions effective upon said axial movement of said shaft to and from said operative position thereof to couple and uncouple respectively said shaft with relation to said drive means, complementary interfitting means on said rail assembly and each said drill head constructed to interfit upon movement of said drill head substantially transversely of said rail assembly and to establish a working position of said drill head with respect to said rail assembly, and releasable means cooperating with said interfitting means to secure each said drill head on said rail assembly in said working position and providing upon release thereof for separate and removable mounting of each said drill head independently of the others thereof following axial withdrawal of said shaft.

2. A multiple spindle paper drill comprising a work table, a plurality of drill heads, a rail assembly for receiving and supporting said plurality of drill heads in aligned working relation with respect to each other and said table, a drive shaft adapted to be engaged in driving relation with all of said aligned drill heads by axial movement thereof lengthwise of said rail assembly, drive means for said shaft including a drive member at one end of said rail assembly, complementary means on said drive member and one end of said shaft for detachably coupling said shaft and said drive member upon axial movement of said shaft to provide for axial withdrawal of said shaft from said drive member and said drill heads, and complementary clamping means on said rail assembly and each said drill head for mounting each individual said drill head on said rail assembly by movement of said drill head and said clamping means in planes substantially transverse of said rail assembly to provide for separate and removable mounting of each said drill head independently of the remainder thereof following said axial withdrawal of said shaft while providing also for adjustment of said drill heads axially of said shaft without removal thereof from said rail assembly.

3. A multiple spindle paper drill comprising a work table, a plurality of drill heads, a rail assembly including a support extending lengthwise thereof for receiving and maintaining said plurality of drill heads in aligned working relation with respect to each other and said table, a drive shaft adapted to be engaged in driving relation with all of said aligned drill heads by axial movement thereof substantially parallel with said support, releasable retaining means for said shaft defining the operative position thereof in said driving relation with said drill heads and providing for axial withdrawal of said shaft from said aligned drill heads, drive means on said rail assembly, said shaft and said drive means including portions effective upon said axial movement of said shaft to and from said operative position thereof to couple and uncouple respectively said shaft with relation to said drive means, complementary interfitting means on said rail assembly and each said drill head constructed to interfit upon movement of said drill head substantially transversely of said rail assembly and to establish a working position of said drill head with respect to said rail assembly, and releasable means cooperating with said interfitting means to secure each said drill head on said rail assembly in said working position and providing upon release thereof for separate and removable mounting of each said drill head independently of the others thereof following axial withdrawal of said shaft, and guide surfaces on said interfitting means providing for adjustment of said drill heads axially of said shaft without said withdrawal of said shaft.

4. A multiple spindle paper drill comprising a work table having a front and two sides, a plurality of drill heads, a rail assembly extending lengthwise from side to side of said table for receiving and maintaining said plurality of drill heads in aligned working relation with respect to each other and said table, means for mounting each said drill head on said rail assembly in any desired spaced position sidewise of said table, said mounting means including cooperating means on said rail assembly and each said drill head for mounting each individual said drill head on said rail assembly directly from the front of said table to provide for separate and removable mounting of each said drill head independently of the remainder thereof, a drive shaft adapted to be engaged in driving relation with all of said aligned drill heads by axial movement thereof with respect to said rail assembly, drive means for said shaft including a drive member at one end of said rail assembly, complementary means on said drive member and one end of said shaft for detachably coupling said shaft and said drive member upon axial movement of said shaft, and releasable means for retaining said shaft in said coupled relation with said drive member to facilitate axial withdrawal of said shaft from said drive member and said drill heads for ready removal or addition of certain of said drill heads without affecting the positions of the others thereof on said rail assembly.

5. A multiple spindle paper drill comprising a work table, a plurality of drill heads, a rail assembly including a support extending lengthwise thereof for receiving and maintaining said plurality of drill heads in aligned working relation with respect to each other and said table, a drive shaft adapted to be engaged in driving relation with all of said aligned drill heads by axial movement thereof substantially parallel with said support, drive means for said shaft including a drive member at one end of said rail assembly, complementary means on said drive member and one end of said shaft for detachably coupling said shaft and said drive member upon axial movement of said shaft to provide for axial withdrawal of said shaft from said drive member and said drill heads, releasable means for retaining said shaft in said coupled relation with said drive member, and cooperating means on said rail assembly and each said drill head for mounting each individual said drill head on said support by movement of said drill head in a plane substantially transverse of said support to provide for separate and removable mounting of each said drill head independently of the remainder thereof following said axial withdrawal of said shaft, said mounting means including guide portions providing for adjustment of said drill heads lengthwise of said support.

6. A multiple spindle paper drill comprising a work table, a plurality of drill heads, a drive gear carried by each said drill head and having a hollow hub, a rail assembly including a support extending lengthwise thereof for receiving and maintaining said plurality of drill heads in aligned working relation with respect to each other and with said gear hubs in axial alignment, means for separately mounting each said drill head on said support in any desired spaced position lengthwise of said support, a drive shaft adapted to be engaged in driving relation with all of said drill heads by axial movement thereof through said aligned gear hubs, drive means for said shaft including a drive member at one end of said rail assembly, complementary means on said drive member and one end of said shaft for detachably coupling said shaft and said drive member upon axial movement of said shaft through said gear hubs, means forming a handle on the other end of said shaft to facilitate axial withdrawal of said shaft from said drive member and said drill heads, and said mounting means for said drill heads including cooperating means on said support and each said drill head for mounting each individual said drill head on said support by movement of said drill head in a plane substantially transverse of the axis of said gear therein to provide for separate and removable mounting of each said drill head independently of the remainder thereof following said axial withdrawal of said shaft.

References Cited in the file of this patent

UNITED STATES PATENTS

| | | |
|---|---|---|
| Re. 20,483 | Lewis et al. | Aug. 24, 1937 |
| 446,954 | Shengle | Feb. 24, 1891 |
| 1,407,059 | Geer | Feb. 21, 1922 |
| 1,554,060 | Wright | Sept. 15, 1925 |
| 1,808,472 | Mielke | June 2, 1931 |
| 1,835,551 | Wright | Dec. 8, 1931 |
| 2,142,560 | Eickman | Jan. 3, 1939 |
| 2,338,095 | Campbell | Jan. 4, 1944 |